United States Patent [19]
Willgohs

[11] Patent Number: 5,662,810
[45] Date of Patent: Sep. 2, 1997

[54] METHOD AND APPARATUS FOR EFFICIENTLY DEWATERING CORN STILLAGE AND OTHER MATERIALS

[76] Inventor: Ralph H. Willgohs, 7805 Falknor Rd., Covington, Ohio 45318

[21] Appl. No.: 520,409

[22] Filed: Aug. 29, 1995

[51] Int. Cl.$^6$ ................................. B01D 21/26
[52] U.S. Cl. .............. 210/781; 210/787; 210/806; 100/117; 203/10; 426/624; 426/630; 435/163
[58] Field of Search ................... 210/781, 787, 210/806; 426/624, 630; 435/163; 203/10; 100/117

[56] References Cited

U.S. PATENT DOCUMENTS

| | | |
|---|---|---|
| 4,081,366 | 3/1978 | O'Donnell . |
| 4,106,487 | 8/1978 | Randall et al. .................. 127/68 |
| 4,144,355 | 3/1979 | Rawlings et al. ................ 426/2 |
| 4,185,680 | 1/1980 | Lawson ........................... 162/5 |
| 4,311,721 | 1/1982 | Yoshizawa et al. .............. 426/623 |
| 4,552,775 | 11/1985 | Baeling et al. .................. 426/624 |
| 4,662,990 | 5/1987 | Bonanno ......................... 159/20 |
| 4,952,504 | 8/1990 | Pavilon .......................... 435/163 |
| 4,994,115 | 2/1991 | Giesfeldt et al. ............... 127/67 |
| 5,076,895 | 12/1991 | Greenfield et al. .............. 203/10 |

OTHER PUBLICATIONS

Low, "The Efficient Production of High Quality Distiller's Dark Grains Using Stord Dehydration Process Technology", 1988 Fuel Ethanol Workshop, St. Louis, MO, Jun. 15–17.

McInnis, "DDGS Production in the Fuel Ethanol Industry" 1992 Fuel Ethanol Workshop, Witchita, KS, Jun. 9–11.

*Primary Examiner*—David A. Reifsnyder
*Attorney, Agent, or Firm*—Eric H. Willgohs

[57] ABSTRACT

A new process and apparatus efficiently dewater aqueous solids residual after fermentation and distillation, such as corn stillage. The feed stream of aqueous solids slurry is fractionated into two or more sub-streams in such a way that one of the sub-streams contains predominately heavy particulate solids and has substantially improved free-draining characteristics. A second sub-stream contains lighter particles, entrained fines of the heavy particles, and a major portion of the liquid from the feed stream. The free-draining sub-stream is dewatered using a device such as a screen centrifuge or a screw press, both of which produce a cake of relatively high solids content. The remaining liquid from the feed stream is concentrated in an evaporator, before being mixed with the dewatered solids which may be dried to produce an animal feed.

14 Claims, 4 Drawing Sheets

[ PRIOR ART ]

5,662,810

METHOD AND APPARATUS FOR EFFICIENTLY DEWATERING CORN STILLAGE AND OTHER MATERIALS

BACKGROUND OF THE INVENTION

The present invention relates generally to dewatering aqueous-solids by-product streams in alcohol production from grains and plant fibers, which by-product streams are commonly called stillage. More specifically, this invention relates to an improved method for dewatering such stillage to produce solids useful for animal feeds.

In the production of fuel alcohol from plant materials, the biomass is mixed with hot water to produce a wort, which is fermented until the final alcohol level is reached. The fermented contents are then typically discharged as a slurry to the beer well and from there to the beer still where the alcohol is removed by distillation. The remainder, after distillation, is known as the still bottoms or stillage, and consists of a large amount of water together with the spent solids.

Stillage in general has a complex composition; this is true especially for corn stillage, which includes the non-fermented fibers from the hull and tipcap of the corn kernel, as well as, particles of the corn germ with high oil content, oil and other lipids, the non-fermented portions of the corn kernel such as gluten, any residual unreacted starch, solubles such as proteins and enzymes, and the byproducts and residue of fermentation including dead yeast cells. The particle sizes range widely from broken parts of kernels 1-2 millimeters in size, down to fines in the under 10 micron range. Typically, stillage is dewatered to produce animal feeds. This feed-production process has added benefit of reducing waste disposal costs from the alcohol production.

FIG. 1 illustrates a conventional process for handling stillage, currently used in typical dry mill ethanol plants. Aqueous solids, such as whole stillage from corn, flow from the distillation column (which is not shown) along path 10 to a solid bowl decanter centrifuge 120 which separates the feed stream according to density into cake (the "heavier" substances) 121, and thin stillage (the lighter substances) 122. Since most corn solids are heavier than water, the cake 121 contains most of the solids. The thin stillage 122 typically has 5-6% solids of which about half are suspended solids, the remainder being dissolved solids including proteins, acids, unreacted sugars, and others. The suspended solids in the thin stillage are predominately fines but there is not a sharp cutoff since some larger particles are subject to carry-over with the liquid. Thin stillage is typically accumulated in a holding tank 129, from which typically 30-60% is recirculated as "backset" 130 to the cooking and fermentation stages to provide nutrients and to reduce the fresh water requirements. The remainder of the thin stillage 131 is sent to the evaporator 124 which concentrates the solids to a syrup 125 of typically 30-50% solids. This syrup is added to the cake and the combined stream 126 is, typically, sent to the dryer (not shown) to be dried to about 10-11% moisture.

The dewatering machinery which are generally most effective at producing high dry solids content, such as screen centrifuges and screw presses, have not proven feasible with corn stillage. Indeed, corn stillage and stillage from other grain fermentation has proven to be too fine and sticky for most separation devices. The typical industry practice has been to dewater such stillage using said solid bowl decanter centrifuges which are very functional, but which typically only produce cake solids content in the 30-35% range, in addition to having high electricity usage and high maintenance costs.

Numerous methods of overcoming this situation have been reported, such as separating most of the solids from the beer liquid prior to distillation so as to permit use of a screw press as described by B. J. Low in "The Efficient Production of High Quality Distiller's Dark Grains Using Stored Dehydration Process Technology." The separation step is followed by dewatering in a screw press to a solids content 50-54%, and then by drying in a special dryer. However, the presence of the alcohol at the separation step greatly complicates the drying process, requiring special closed-cycle dryers which are costly to purchase and expensive to maintain, as well as necessitating an alcohol vapor recovery system.

In some such ethanol production processes, such as in the production of ethanol from citrus residue as described in U.S. Pat. No. 4,952,504 issued to Pavilon, highly effective dewatering machinery such as screen centrifuges and screw presses (yielding dry-solids content typically 35-50% or higher) can be used to efficiently dewater solids filtered from the wort prior to fermentation. In fermentation from grains such as corn, however, this dewatering from the wort stage has the disadvantage of reducing the final alcohol yield.

U.S. Pat. No. 4,552,775, issued to Baeling, discloses a method for dewatering the stillage from a unique fermentation process which produces stillage of 20-30% dry substance (compared to the conventional corn fermentation which produces a stillage in the 5-12% solids range). This high solids stillage is combined with sufficient recycled dry product to obtain a 50-70% dry substance content which is then pelletized before drying in a through air dryer of special design. This method has the disadvantage that when applied to conventional stillages of 5-12% solids, the required recycle rate becomes very large, increasing the size and expense of the dryer.

A significant need remains for an improved, efficient and cost-effective method and apparatus to dewater conventional grain stillage, and in particular corn stillage, for the fuel alcohol industry.

SUMMARY OF THE INVENTION

According to a primary aspect of the present invention, a new process and apparatus are provided for efficiently dewatering aqueous solids residual after fermentation and distillation, such as corn stillage. The feed stream of aqueous solids slurry is fractionated into two or more sub-streams in such a way that one of the sub-streams contains predominately large particulate solids and has substantially improved free-draining characteristics. A second sub-stream contains entrained fines of the heavy particles, and a significant portion of the liquid from the feed stream. The free-draining sub-stream is dewatered using a primary dewatering device such as a screen centrifuge or a screw press, both of which produce a cake of relatively high solids content. The remaining liquid from the feed stream may be Concentrated in an evaporator, before being mixed with the dewatered solids which may be dried to produce, for example, an animal feed.

A further understanding of the nature and advantages of the invention may be realized by reference to the remaining portions of the specification and the drawings.

DESCRIPTION OF THE PREFERRED EMBODIMENT

Figure 2:
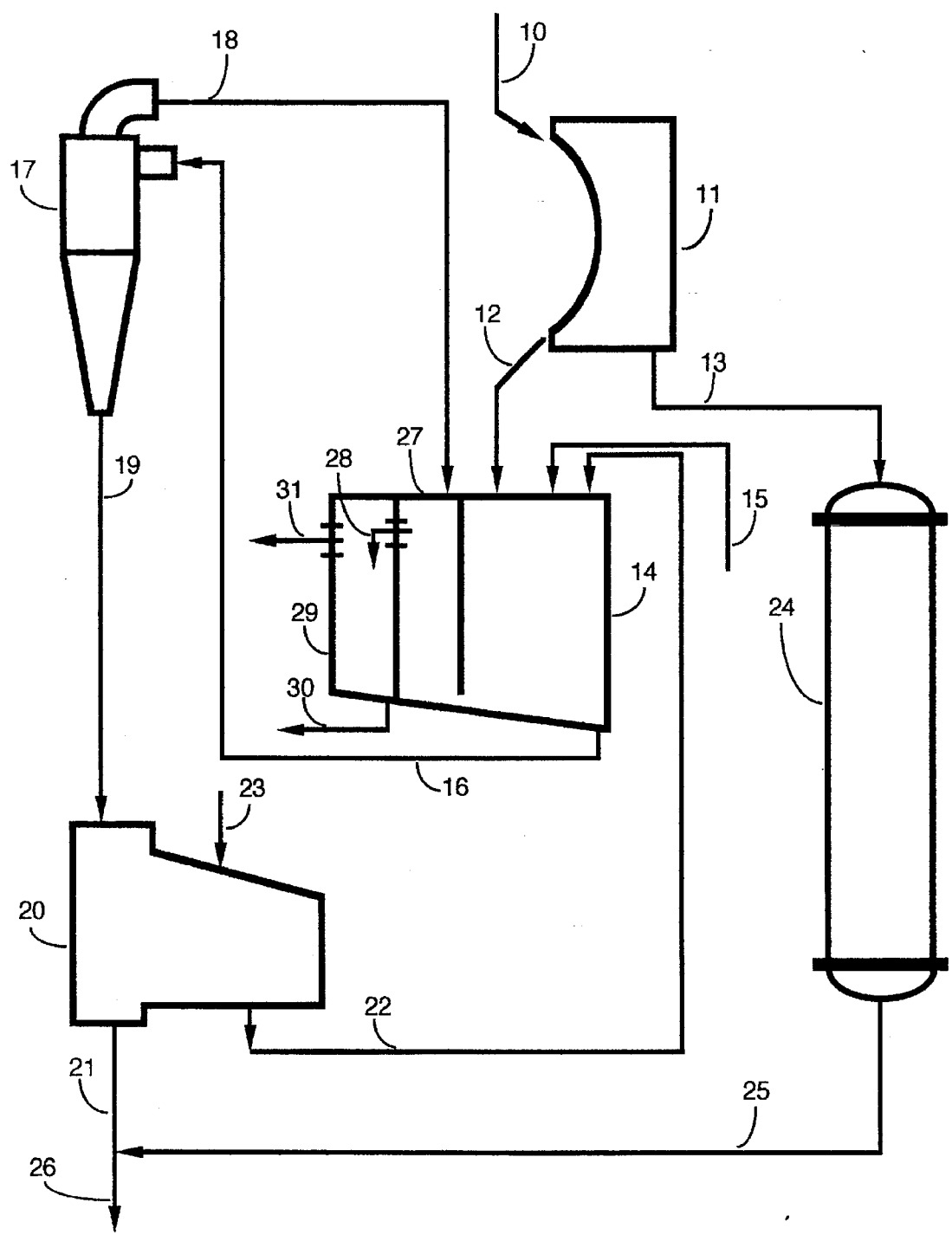
FIG. 2 shows a schematic flowchart of an apparatus and corresponding method for dewatering stillage in accordance with a first embodiment of the present invention, with flow directions indicated by arrows.

FIG. 2 shows a schematic flowchart of an apparatus and corresponding method for dewatering stillage in accordance with a first embodiment of the present invention, with flow directions indicated by arrows. Aqueous solids, such as whole corn stillage, flow from the distillation column, which is not shown, along path 10 to a screws bend 11 which classifies the flow into "overs" 12, containing the large solids, and an throughflow 13 containing liquid and fines. The "overs" solids 12 are discharged into a rinse tank 14, to which is added rinse water 15 and the centrate 22 from the centrifuge 20. One preferred source of the rinse water 15 is recycled process water such as the side stripper bottoms or evaporator distillate. The reslurried mixture 16 is pumped by pumping means to the feed port of the second stage separation device 17, such as a hydrocyclone. Alternatively, this second stage separation device 17 might also be a screen bend or similar device.

The underflow slurry 19 from the hydrocyclone, composed primarily of large particles, is fed to a screen centrifuge 20 for the primary dewatering. Wash water 23, from the same sources as the rinse water 15, may be added to the centrifuge to rinse the solids a final time while on the centrifuge screen. The centrate liquid 22, including the used wash water, is recycled to the rinse tank 14 for addition to the reslurry mix. The solids cake 21 is discharged from the centrifuge 20 and is sent to the dryer (which is not shown).

Concentrated solubles syrup 25 from the evaporator 24 may be added to the cake solids 21 before the combined flow 26 is fed to the dryer (which is not shown) and are dried to produce DDGS for animal feed. Alternatively, as is well known in the industry, the dewatered solids may be used as wet feed without drying.

The "overflow" stream 18 from the second stage separation hydrocyclone 17 is discharged into a side chamber 27 which is connected to the rinse tank 14 in a manner which allows a portion of the hydrocyclone overflow 18 to be recycled if needed to maintain the reslurried mixture 16. Any excess from the side chamber 27 of the rinse water tank, which is not needed for the reslurry, is allowed to flow 28 into a receiver tank 29 from which the backset 30 is recycled to the cooking and fermentation process. Any excess not needed for the backset 30 is allowed to overflow 31 and is sent to a secondary recovery device 24, such as an evaporator, together with the throughflow 13 from the screen bend 11.

Under some conditions, this secondary recovery may include a third separation device to reduce the flow 31 to the evaporator feed. This third separation device might be a bank of small diameter hydrocyclones or a similar solids recovery device, depending on the level and distribution of solids sizes in the overflow 31.

In one preferred embodiment of this application, the backset flow stream from the rinse tank (30 in FIG. 2) contains only 2–4% solids. This has an advantage over the conventional process in offering greater flexibility in the composition and the amount of water in the backset, thereby making possible the reduction of the quantity of fresh water required for the cook.

In the case of corn stillage, the flow of whole stillage from the distillation column bottom will typically be at an elevated temperature of 160°–195° F. and will contain 8–12% total solids. In one preferred embodiment for representative corn stillage it has been found that a particle size cut-off of about 75–200 microns between the "liquid and small particles" phase (the throughflow 24 from the screen bend or the overflow 18 from the hydrocyclone) and the "large solids" phase (the "overs" 12 from the screen bend or the underflow 19 from the hydrocyclone) is effective, with the particles larger than the cut-off predominantly in the said "large solids" phase and the smaller particles predominantly in the "liquid and small particles" phase.

It is possible to use cut-off sizes from a range of about 15 microns to about 500 microns for corn stillage, depending on the fineness of the grind and other variables. Relative to one preferred embodiment with a particle size cut-off in the range of about 75–200 microns, larger cut-off sizes will usually result in a lesser amount of solids being retained in the desirable free-draining "large solids" phase; and smaller sizes will usually result in lower drainage rates. For stillages other than corn, and for other aqueous solids the preferred particle size cut-off may vary.

Figure 1:
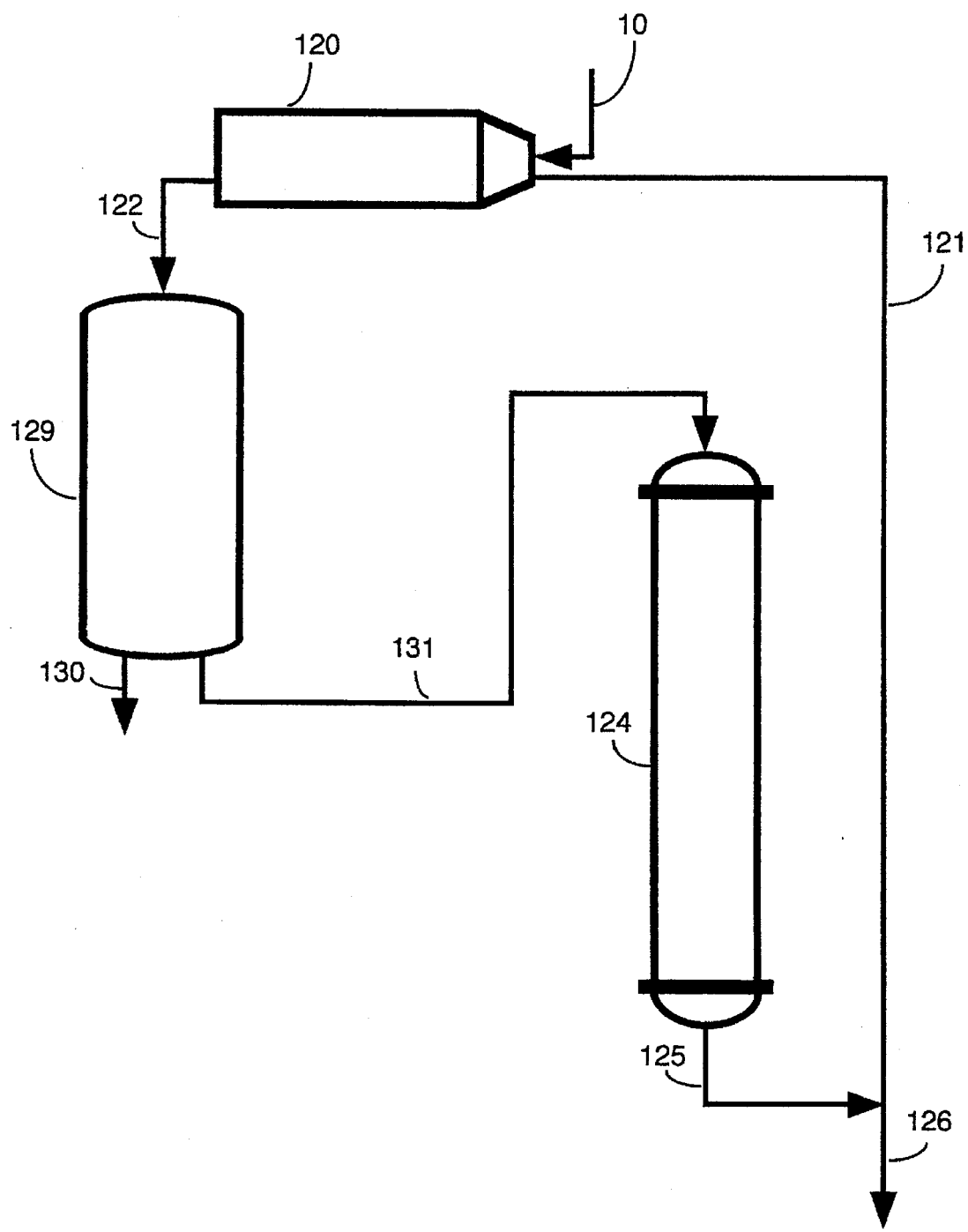
FIG. 1 shows a schematic flowchart of a prior art apparatus and corresponding method for dewatering stillage, with flow directions indicated by arrows.

In one preferred embodiment, the separation device for corn stillage would be of the pressure-fed 120° screen bend type, and have 75–200 micron screen openings, typically producing "overs" solids containing 10–18% dry solids. The "overs" flow would contain 75–90% of the suspended solids in the feed slurry. The throughflow from the first stage separation screen might typically contain 5–6% total dry solids and be generally similar in composition to thin stillage from the conventional process (as shown in FIG. 1). In the case of a hydrocyclone, it is often preferred to operate at a moderately high overflow-to-feed ratio in the range of 30–70%.

The primary dewatering device in one preferred embodiment is a commercially available screen centrifuge of the cone and worm type, having a cone angle in the range of 10°–20° and a screen opening size which is 5–50 microns smaller than the particle cut-off size produced by the screen bend or other separation device. However, it is possible to use other screen centrifuges, one such example would be a screen bowl decanter centrifuge of an appropriate design and screen opening size.

Pre-Trial Analysis.

Corn stillage solids from a typical decanter centrifuge cake were bench tested to determine the effect of particle size classification on the drainage characteristics of the solids. The drainage rate of the solids was measured using a Buchner funnel with a 90 micron screen bottom and a vacuum of about 14 inches of water column. A manufacturer of screen centrifuges provided a general criteria that materials should have a drainage rate of about 2 gallons per minute per square foot in order to be well Suited for processing on a screen centrifuge. Samples of the stillage solids were prepared in different ways and the respective drainage rates were measured. A cake layer of solids about 1 inch thick in the bottom of the Buchner funnel and about 500 ml of drain liquid were typically used; with the following results:

| Sample No. | Preparation of solids | Drain Liquid | Drainage Rate (gal/min/sq. ft.) |
| --- | --- | --- | --- |
| 1 | none (untreated stillage cake) | tap water | <0.15 |
| 2 | washed with tap water to remove fines | tap water | ~1.5 |
| 3 | rewashed with tap water | tap water | 3 |
| 4 | same as in (3) | mother liquor | 2.1 |

Particle size analysis showed that the as-received solids in Sample 1 had about 12% by weight of solids smaller than 75 microns, while the rewashed solids of Samples 3 & 4 had only 1.8% by weight of the under 75 micron fines. The particle size distribution of the particles larger than 75 micron were not noticeably different between the as-received and the rewashed samples. It is important to note that even though the solid bowl decanter centrifuge of the conventional prior art process provides some degree of particle size classification in the cake which was used here (sample 1), that degree of classification is insufficient and the drainage rate of the as-received stillage solids (sample 1) is far too poor to meet the criteria for processing on a screen centrifuge. However, after washing to remove most of the fines, free liquid, and solubles, the drainage rate is dramatically improved.

Production Trial.

An in-plant test was conducted in a smaller but representative corn dry milling ethanol plant, which normally employed a conventional solid bowl decanter dewatering process yielding a cake having 33–34% dry solids. A sidestream of whole stillage was dewatered according to the present invention, similar to the description in FIG. 1, using a TEMA Conturbex H-250 cone screen centrifuge, while a main stream of whole stillage continued to be dewatered through the conventional solid bowl decanter process. The stillage solids, at a temperature of about 190° F., were first separated from the thin stillage on a Dorr-Oliver 300° DSM screen bend (a standard, commercially available, pressure-fed, screen bend) with a 100 micron screen opening size; with the "overs" flow having about 12–18% dry solids, and the "throughflow" or thin stillage having about 5.5–5.8% dry solids. The "overs" solids were then re-slurried with rinse water to about 5–7% dry solids before being pumped with a centrifugal pump to a Krebs D4B hydrocyclone. The cyclone overflow had about 4% dry solids and the underflow, having 10–13% dry solids, was discharged to the feed of the centrifuge. The system was also successfully tested with the positions of the DSM screen and the hydrocyclone reversed. The rinse water was taken first from tap water and then from evaporator distillate. The screen centrifuge produced cake with of 37–38% dry solids at the same time the conventional solid bowl decanter process was producing a cake having 33–34% dry solids.

Conclusions from the Production Trial.

This Production Trial successfully demonstrated that whole stillage from Corn can be effectively dewatered using the teachings of this application. More specifically, the trial showed that, after the preparation step of separating the large solids from the fines and solubles, the large solids could be effectively dewatered with a screen centrifuge. Significantly, a) the solids level of 5.5–5.8% in the throughflow from the screen bend was well within the normal range of 5–6% for conventional process thin stillage; b) the solids level of 4% in the cyclone overs was even lower, which is an advantage over the conventional process; and c) the dry solids content of the screen centrifuge cake at 37–38% was significantly better than the 30–34% typical of the solid bowl decanter of the conventional process.

The effect of cake solids in this range is very non-linear, thus the above improvement in cake solids with the screen centrifuge reduces the water load to the dryer by about 17%. In addition, the screen centrifuge has advantages in requiring substantially less electrical energy (typically 40–50% less) to operate at a given capacity, and in generally having lower maintenance costs than a solid bowl decanter. The savings in electrical usage and maintenance costs can be equally important as the higher cake solids in reducing operating costs.

For clarity, it should be noted that solid bowl decanters in some circumstances (such as very high speed or reduced throughput) can reach cake solids levels of 37–38%, however, at industrial capacities and conditions the 30–34% range is typical. For the purposes of this application, industrial capacities are considered to have a total whole stillage flow for the plant of at least 10 gallons per minute, and more typically in the range of 50–600 gallons per minute.

Alternative Embodiments.

Figure 3:
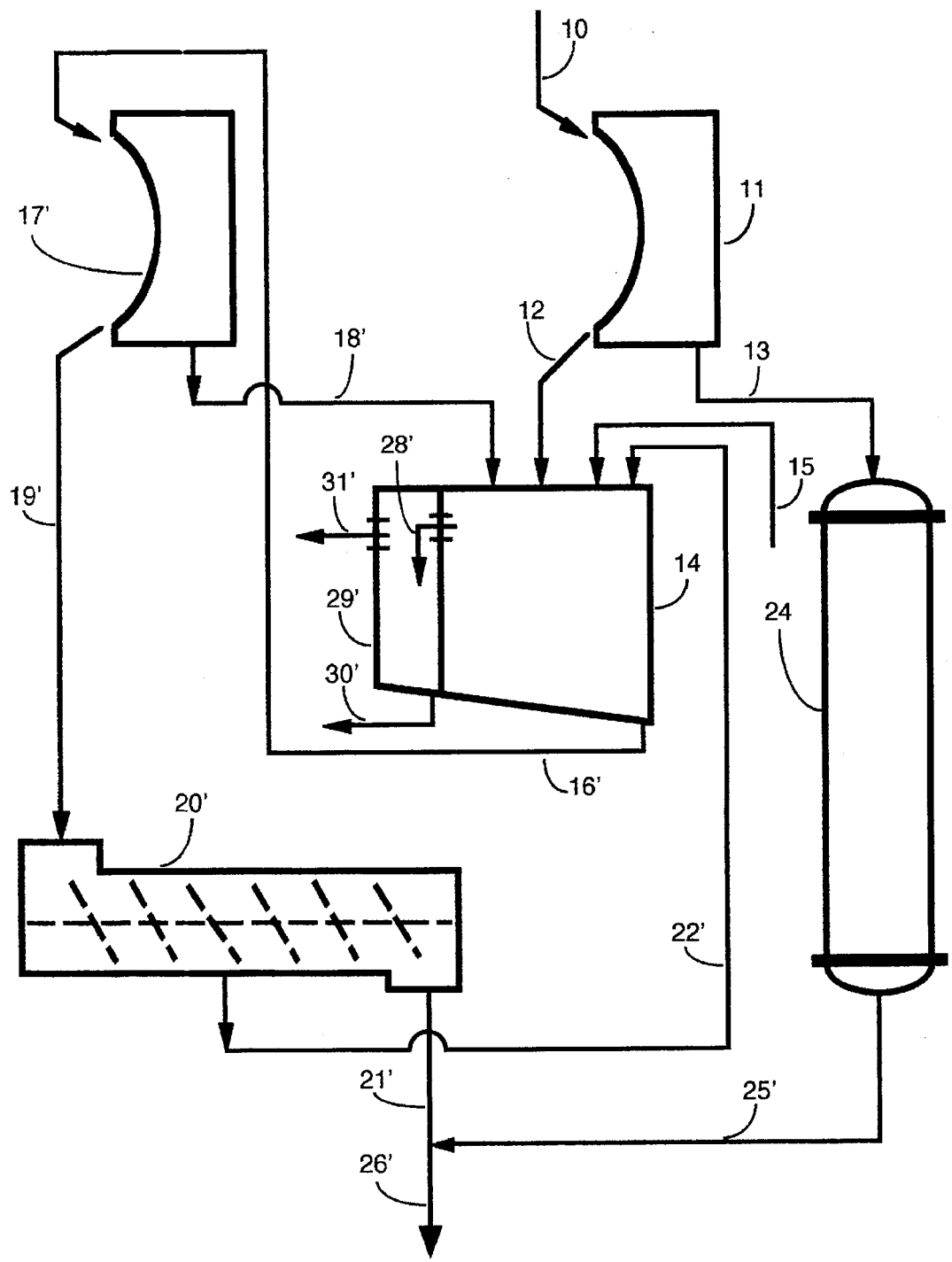
FIG. 3 shows a schematic flowchart of a second embodiment of apparatus constructed in accordance with the present invention, with flow directions indicated by arrows.

Rather than a hydrocyclone, the second stage separation device might also be a screen bend or other similar device, shown as 17' in FIG. 3. Also, a screw press 20' in FIG. 3 might also be used either in place of the screen centrifuge, or following a screen centrifuge wherein the two are used in combination as the primary dewatering device. Referring now to FIG. 3, aqueous solids, such as whole corn stillage, flow from the distillation column, which is not shown, along path 10 to a screen bend 11 which classifies the flow into "overs" 12, containing the large solids, and an throughflow 13 containing liquid and fines. The "overs" solids 12 are discharged into a rinse tank 14, to which is added rinse water 15 and the pressate 22' from the screw press 20'. The reslurried mixture 16' is pumped by pumping means to the feed port of the second stage separation device 17', in this case a screen bend.

The "overs" 19' from the hydrocyclone, composed primarily of large particles, is fed to a screw press 20' for the primary dewatering. The pressate liquid 22' is recycled to the rinse tank 14 for addition to the reslurry mix. The solids cake 21' is discharged from the screw press 20" and is sent to the dryer (which is not shown).

As before, concentrated solubles syrup 25' from the evaporator 24 may be added to the cake solids 21' before the combined flow 26' is fed to the dryer (which is not shown) and are dried to produce DDGS for animal feed.

The "throughflow" stream" 18' from the second stage separation screen bend 17' is discharged into the rinse tank 14 in a manner which allows a portion of the "throughflow" stream 18' to be recycled if needed to maintain the reslurried mixture 16'. Any excess from the rinse water tank, which is not needed for the reslurry, is allowed to flow 28' into a receiver tank 29' from which the backset 30' is recycled to the cooking and fermentation process. Any excess not needed for the backset 30' is allowed to overflow 31' and is sent to the evaporator feed, together with the thin stillage 13.

Figure 4:
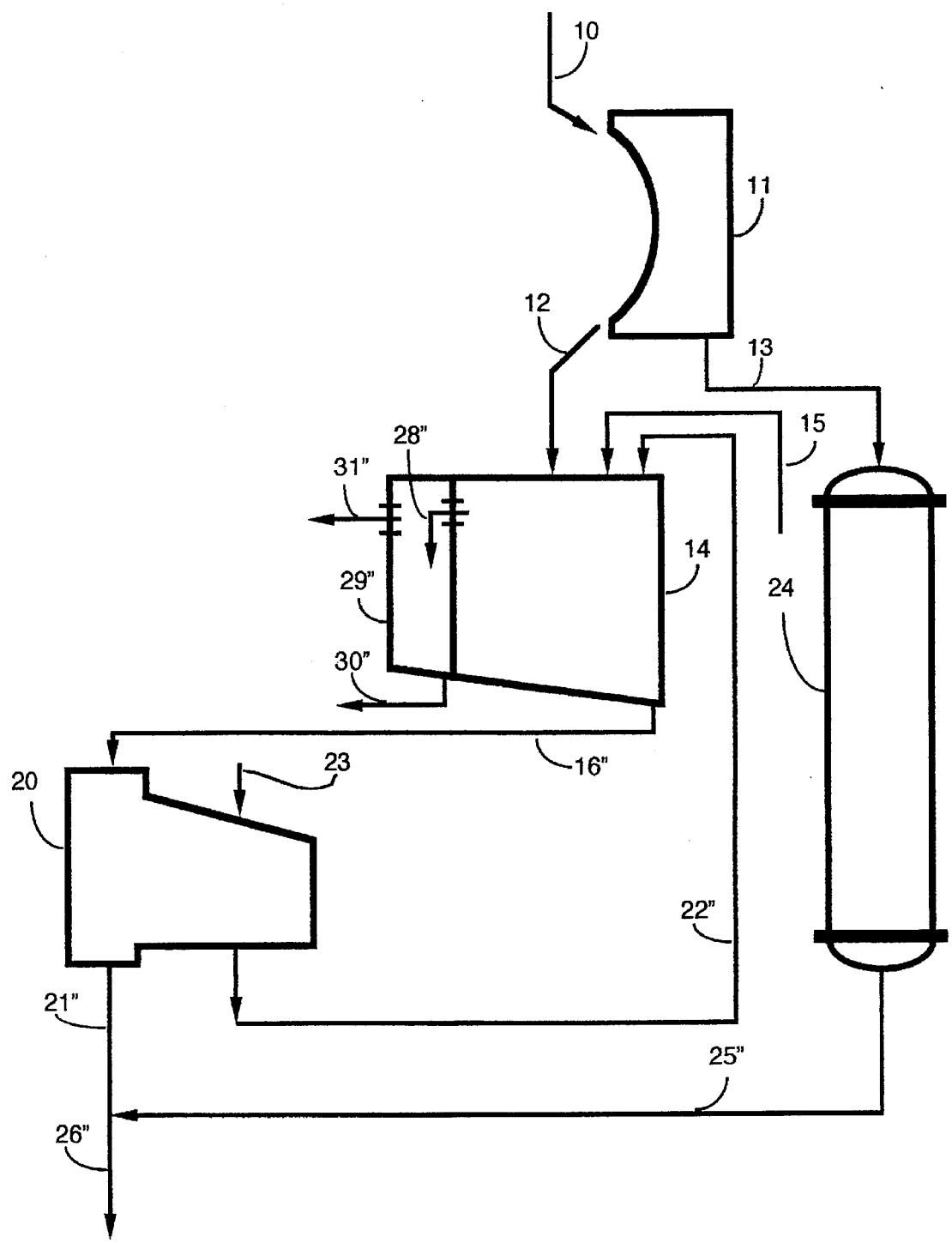
FIG. 4 shows a schematic flowchart of a third embodiment of apparatus constructed in accordance with the present invention, with flow directions indicated by arrows.

In an additional alternative embodiment, as shown in FIG. 4, rather than using a second stage separation device the reslurried mixture 16" is fed directly to the primary dewatering device 20 such as a screen centrifuge. Aqueous solids, such as whole corn stillage, flow from the distillation column, which is not shown, along path 10 to a screen bend 11 which classifies the flow into "overs" 12, containing the large solids, and an throughflow 13 containing liquid and fines. The "overs" solids 12 are discharged into a rinse tank 14, to which is added rinse water 15 and the centrate 22" from the centrifuge 20. The reslurried mixture 16" is fed to a screen centrifuge 20 for the primary dewatering. Wash water 23, from the same sources as the rinse water 15, may be added to the centrifuge to rinse the solids a final time while on the centrifuge screen. The centrate liquid 22", including the used wash water, is recycled to the rinse tank 14 for addition to the reslurry mix. The solids cake 21" is discharged from the centrifuge 20 and is sent to the dryer (which is not shown).

Concentrated solubles syrup 25" from the evaporator 24 may be added to the cake solids 21" before the combined flow 26" is fed to the dryer (which is not shown) and are dried.

Any excess from the rinse water tank 14, which is not needed for the reslurry, is allowed to flow 28" into a receiver tank 29" from which the backset 30" is recycled to the cooking and fermentation process. Any excess not needed for the backset 30" is allowed to overflow 31" and is sent to the evaporator feed, together with the thin stillage 13.

It is to be understood that the above description is intended to be illustrative and not restrictive. Many other embodiments will be apparent to those of skill in the art upon reviewing the above description. For instance, there are alternative arrangements for the tanks which may be equally effective; in FIG. 2 for example, the receiver tank 29 may be separate from the rinse tank 14, but connected in such a way as to permit the excess 28 to flow by gravity or by pumping means to the receiver tank. Depending on circumstances, another alternative is for the thin stillage 13, as in FIG. 2, to be added to the same receiver tank 29 as the rinse water overflow 28, in such a way as to allow the excess 31 to flow to the evaporator feed.

In a second instance, there are a variety of separation devices are available commercially some of which might be substituted for the screen bends and hydrocyclones described in the preferred embodiments in order to provide an effective separation of the solids and liquid sub-streams.

In a third instance, it is apparent that motive force is required to move the various flowstreams along the flowpaths. Depending on the physical layout, the motive force may be provided by gravity in some cases, in other cases pumping means must be provided.

The scope of the invention should, therefore, be determined with reference to the appended claims, along with the full scope of equivalents to which such claims are entitled.

What is claimed is:

1. A process for dewatering a feed stream of aqueous solids residual from fermentation and distillation, said process comprising the steps of:
   (a) classifying by size the feed stream of aqueous solids slurry into at least a first sub-stream and a second sub-stream, whereby solids in said first sub-stream are predominately particles larger than a predetermined size and solids in said second sub-stream are predominately particles smaller than said predetermined size, wherein said predetermined size is between about 15 microns and about 500 microns;
   (b) thereafter dewatering said first sub-stream in a primary dewatering device; and
   (c) recovering solids from said second sub-stream with a secondary recovery device.

2. The process of claim 1, wherein said step of dewatering said first sub-stream in a primary dewatering device comprises dewatering said first sub-stream with a screen centrifuge.

3. The process of claim 1, wherein said step of dewatering said first sub-stream in a primary dewatering device comprises dewatering said first sub-stream with a screw press.

4. The process of claim 1, wherein said step of dewatering said first sub-stream in a primary dewatering device comprises dewatering said first sub-stream with a screen bowl decanter centrifuge.

5. The process of claim 1, wherein said step of dewatering said first sub-stream in a primary dewatering device comprises dewatering said first sub-stream to yield a cake having at least 35% dry solids.

6. The process of claim 1, further comprising, after said classifying step, the step of rinsing said first sub-stream at least one time by reslurrying with rinse water.

7. The process of claim 6, wherein said step of rinsing said first sub-stream at least one time by reslurrying with rinse water comprises rinsing said first sub-stream at least one time by reslurrying with rinse water to yield a discharge flow stream to the evaporator containing not more than 1.5% of suspended solids by dry weight.

8. The process of claim 1, wherein said feed stream of aqueous solids are residual from fermentation and distillation of grain solids containing corn.

9. A process for dewatering a feed stream of aqueous solids residual from fermentation and distillation, said process comprising the steps of:
   (a) declassifying the feed stream of aqueous solids slurry into at least a first sub-stream and a second sub-stream using a screen bend having a screen opening size in the range of about 30 to about 300 microns;
   (b) thereafter dewatering said first sub-stream in a primary dewatering device selected from the group consisting of a screen centrifuge and a screw press, to yield a cake having a dry solids content of at least 32%; and
   (c) recovering solids from said second sub-stream with a secondary recovery device.

10. The process of claim 9, further comprising, after said classifying step, the step of rinsing said first sub-stream at least one time by reslurrying with rinse water.

11. The process of claim 10, wherein said step of rinsing said first sub-stream at least one time by reslurrying with rinse water comprises rinsing said first sub-stream at least one time by reslurrying with rinse water to yield:
   (a) a cake from said primary dewatering device having a dry solids content of at least 35%; and
   (b) a discharge flow stream from the secondary recovery device to the evaporator containing not more than 1.5% of suspended solids by dry weight.

12. The process of claim 9, wherein said feed stream of aqueous solids are residual from fermentation and distillation of grain solids containing corn.

13. The process of claim 12, further comprising, after said classifying step, the step of rinsing said first sub-stream at least one time by reslurrying with rinse water.

14. The process of claim 13, wherein said step of rinsing said first sub-stream at least one time by reslurrying with rinse water comprises rinsing said first sub-stream at least one time by reslurrying with rinse water wherein at least 95% by dry weight of the suspended solids in said first sub-stream are of a particle size greater than a predetermined size in the range of 30 to 300 microns, to yield a cake from the primary dewatering device having a dry solids content of at least 35%; and a discharge flow stream from the secondary recovery device containing not more than 1.5% of suspended solids by dry weight.

* * * * *